(12) United States Patent
Hemes et al.

(10) Patent No.: US 10,399,178 B2
(45) Date of Patent: Sep. 3, 2019

(54) MATERIAL PROCESSING SYSTEM WITH LOW-INERTIA LASER SCANNING AND END EFFECTOR MANIPULATION

(71) Applicant: 3M INNOVATIVE PROPERTIES COMPANY, St. Paul, MN (US)

(72) Inventors: Brett R. Hemes, Woodbury, MN (US); Schoen A. Schuknecht, Hudson, WI (US); Andrew K. Hartzell, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 547 days.

(21) Appl. No.: 14/653,921

(22) PCT Filed: Dec. 11, 2013

(86) PCT No.: PCT/US2013/074233
§ 371 (c)(1),
(2) Date: Jun. 19, 2015

(87) PCT Pub. No.: WO2014/107274
PCT Pub. Date: Jul. 10, 2014

(65) Prior Publication Data
US 2015/0352667 A1    Dec. 10, 2015

Related U.S. Application Data

(60) Provisional application No. 61/740,340, filed on Dec. 20, 2012.

(51) Int. Cl.
*B23K 26/03* (2006.01)
*B25J 9/16* (2006.01)
(Continued)

(52) U.S. Cl.
CPC .......... *B23K 26/032* (2013.01); *B23K 26/082* (2015.10); *B23K 26/142* (2015.10);
(Continued)

(58) Field of Classification Search
CPC .. B23K 26/032; B23K 26/082; B23K 26/144; B23K 26/26; B23K 26/142; B23J 9/1684
(Continued)

(56) References Cited

U.S. PATENT DOCUMENTS 5,204,517 A  *  4/1993  Cates ............... B44D 3/166
                                                    134/1
6,393,334 B1    5/2002  Lewis
(Continued)

FOREIGN PATENT DOCUMENTS

DE    102007062212 A1    6/2009
DE    10 2011 016519 A1   10/2012
(Continued)

OTHER PUBLICATIONS

International Search Report for PCT International Application No. PCT/US2013/74233 dated Apr. 28, 2014, 2 pages.

*Primary Examiner* — Thien S Tran
(74) *Attorney, Agent, or Firm* — James A. Baker (57) ABSTRACT

An apparatus includes a robotic manipulator with a stationary base, and an end effector actuated by the robotic manipulator, wherein the end effector is adjacent to a workpiece. A scanning laser head unit includes a laser and an optical train configured to move a laser beam over the workpiece. A control unit is configured to move the robotic manipulator such that movement of the end effector tracks movement of the laser beam.

9 Claims, 8 Drawing Sheets

(51) Int. Cl.
   *B23K 26/082* (2014.01)
   *B23K 26/144* (2014.01)
   *B23K 26/142* (2014.01)

(52) U.S. Cl.
   CPC ........... *B23K 26/144* (2015.10); *B25J 9/1684* (2013.01); *G05B 2219/39033* (2013.01); *G05B 2219/40623* (2013.01); *Y10S 901/02* (2013.01)

(58) Field of Classification Search
   USPC .............. 219/121.61, 121.63, 121.73, 121.68
   See application file for complete search history.

(56) References Cited

U.S. PATENT DOCUMENTS 7,248,940 B2   7/2007  Neumann
   7,974,735 B2   7/2011  Irie
   2002/0104833 A1*  8/2002  Bradley ............. B23K 26/0884
                                                    219/121.63
   2003/0146198 A1   8/2003  Feistel
   2005/0224470 A1* 10/2005  Burt ..................... B23K 26/147
                                                    219/121.63
   2010/0176539 A1   7/2010  Higashi et al.
   2012/0080413 A1   4/2012  Kishino et al.
   2012/0241419 A1*  9/2012  Rumsby ............. B23K 26/0084
                                                    219/121.6

FOREIGN PATENT DOCUMENTS

JP           06114443 A   *  4/1994
   JP        2005-177786 A      7/2005
   JP         2005177786 A  *  7/2005
   JP        2007-044726 A      2/2007
   JP         2007044726 A  *  2/2007
   JP        2010-188475 A      9/2010
   JP        2011-125877 A      6/2011

* cited by examiner

MATERIAL PROCESSING SYSTEM WITH LOW-INERTIA LASER SCANNING AND END EFFECTOR MANIPULATION

CROSS REFERENCE TO RELATED APPLICATIONS

This application is a national stage filing under 35 U.S.C. 371 of PCT/US2013/074233, filed Dec. 11, 2013, which claims priority to U.S. Application No. 61/740,340 filed Dec. 20, 2012, the disclosure of which is incorporated by reference in its/their entirety herein.

BACKGROUND

Lasers can be used in a number of industrial manufacturing processes including, for example, cutting, drilling, machining and scribing. To move a laser beam in a non-scanning (flying optics) laser process, the laser optics move relative to a workpiece being processed, and the orientation of the laser beam with respect to the workpiece remains constant. In contrast, scanning laser processes utilize steering techniques to trace (scan) the desired laser spot trajectories onto the workpiece. In scanning processes the laser beam departure angle is varied using an optical train that remains stationary with respect to the workpiece being processed. In scanning processes, the orientation of the laser beam is a time varying function of the spot trajectory of the beam.

SUMMARY

In general, the present disclosure is directed to a method and an apparatus for achieving highly dynamic localized workpiece processing in conjunction with a scanning laser system. The apparatus utilizes low-inertia robotic mechanisms to drive a low-mass localized end effector that tracks the scanned laser output over a workpiece. The actuators for the robotic mechanisms (for example, heavy motors) remain stationary, requiring only that the end effector and robotic manipulator move and track the laser beam over the workpiece. This configuration results in minimal system inertia, which makes possible accurate tracking by the end effector of a highly dynamic scanned beam. These low-inertia scanning systems provide localized workpiece processing with sufficient acceleration and velocity such that impact on process throughput is minimized. The workpiece can thus be laser converted at high speeds while maintaining product quality.

In one embodiment, this disclosure is directed to an apparatus including a robotic manipulator with a stationary base; an end effector actuated by the robotic manipulator, wherein the end effector is adjacent to a workpiece; a scanning laser head unit including a laser and an optical train configured to move a laser beam over the workpiece; and a control unit configured to move the robotic manipulator such that movement of the end effector tracks movement of the laser beam.

In another embodiment, the disclosure is directed to a system including a robotic manipulator selected from a delta robot and a cable-suspended robot, wherein the robotic manipulator includes a stationary base. An end effector is attached to the robotic manipulator, wherein the end effector is adjacent to a sample region of a workpiece, and wherein the end effector is selected from at least one of a debris management apparatus, an optical element, a sensor, a radiation emitter and a material dispenser. An end effector supply system is connected to the end effector; and a scanning laser head unit fixed with respect to the workpiece, wherein the laser scanning unit includes a laser and a galvanometer scanner configured to move a laser beam to a position in the sample region of the workpiece. The system further includes a control unit configured to move the robotic manipulator to within a distance of ±5 millimeters from the position of the laser beam in the sample region of the workpiece. The control unit includes a trajectory generation module that generates, based on laser trajectory and parameters, power signals for a laser control module to control the laser beam, trajectory data for a laser head unit control module to control the scanning laser head unit, and robot position data for a robotic manipulator control module to actuate the robotic manipulator.

In another embodiment, the disclosure is directed to a method for debris management, including mounting a scanning laser head unit over a web of material, wherein the scanning laser head unit includes a laser and a galvanometer scanner configured to move a laser beam over a surface of the material; mounting over the web a robotic manipulator selected from a delta robot and a cable-suspended robot; wherein the robotic manipulator has attached thereto a debris management apparatus; and moving the robotic manipulator and the debris management nozzle to track the laser beam and remove debris from the surface.

In yet another embodiment, the disclosure is directed to a method for processing a sample region of a material in real time as the material is manufactured, including positioning a scanning laser head unit above the material, wherein the scanning laser head unit includes a galvanometer scanner configured to move a laser beam over the sample region of the material; positioning a robotic manipulator adjacent to the sample region of the material, wherein the robotic manipulator is connected to an end effector overlying the sample region; and controlling the robotic manipulator and the end effector to track within a distance of ±5 millimeters the movement of the laser beam in the sample region.

In still another embodiment, the disclosure is directed to an online computerized system for removing debris from a web material as the web material is manufactured. The system includes a robotic manipulator selected from a delta robot and a cable-suspended robot; a debris management nozzle attached to the robotic manipulator, wherein the nozzle is adjacent to a sample region of the web material; a supply source connected to the debris management nozzle, wherein the supply source provides at least one of vacuum and pressurized air; a scanning laser head unit including a laser and a galvanometer scanner; and a control unit in communication with a remote computer and configured to move the robotic manipulator such that movement of the end effector tracks the movement of the laser beam in the sample region.

In another embodiment, the disclosure is directed to a computer-readable storage medium including instructions that, when executed, cause one or more processors of a computing device to: receive, by a software program executing on the processor, laser trajectory data including coordinates relative to a surface of a workpiece, and wherein the software program transforms the position data into: (a) rotational position data representative of a position of at least one mirror in a galvanometer scanner, wherein the scanner is fixed relative to a surface, and wherein the scanner is configured to move a laser beam over the surface; and (b) position data to drive a robotic manipulator attached to an end effector and cause the end effector to track the movement of the laser beam over the surface.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
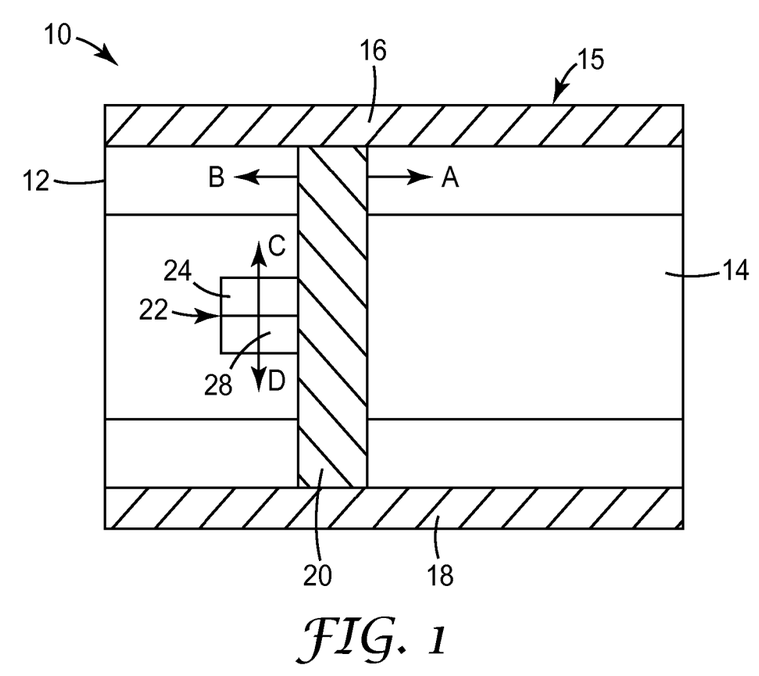
FIG. 1 is a schematic representation of a non-scanning laser processing system.

Referring to FIG. 1, flying optic (non-scanning) laser processing system 10 includes a fixed and flat table 12 that is mounted to a stable surface such as a floor. A workpiece 14 rests on or moves across the table 12 along the direction A. A rigid gantry-like mechanism 15 is mounted on the table 12, which includes a crossbar 20 that moves along directions A and B within parallel rail members 16, 18. A laser head unit 22 moves in directions C and D along the crossbar 20. A laser beam is delivered to the laser head unit 22 by a laser (not shown) along the rail members 16, 18 by an optical train 24. Since the orientation of the beam delivered by the laser head unit 22 is fixed, the parallel rail members 16, 18 should be capable of rapidly moving the crossbar 20 and/or the laser head unit 22 over relatively large distances. The parallel rail members 16, 18 and the crossbar 20 should be rigid to quickly and accurately move the laser head unit 22 over the workpiece 14, and as such are bulky and scale in mass with the size of the table 12 and the area of the workpiece 14 to be processed. The significant inertia of the components of the gantry mechanism 15 and the laser head unit 22 must be overcome to accelerate and/or change the direction of the laser beam. In the design of the non-scanning laser system 10, it is often the case the laser head unit 22 and the workpiece 14 are relatively close to one another, which limits the potential end uses of the system 10.

In the non-scanning system 10, it is relatively simple to add processing functions near the laser spot on the workpiece 14 because the laser head unit 22 and the workpiece 14 can be positioned close together. For example, to manage debris liberated from the workpiece 14 following laser cutting, the laser head unit 22 may include a nozzle 28 that is attached to a vacuum system or a source of compressed air. However, additional processing equipment such as the nozzle 28 also add to the mass of the laser head unit 22, which further limits the ability to accelerate and/or change the direction of the laser beam.

Figure 2:
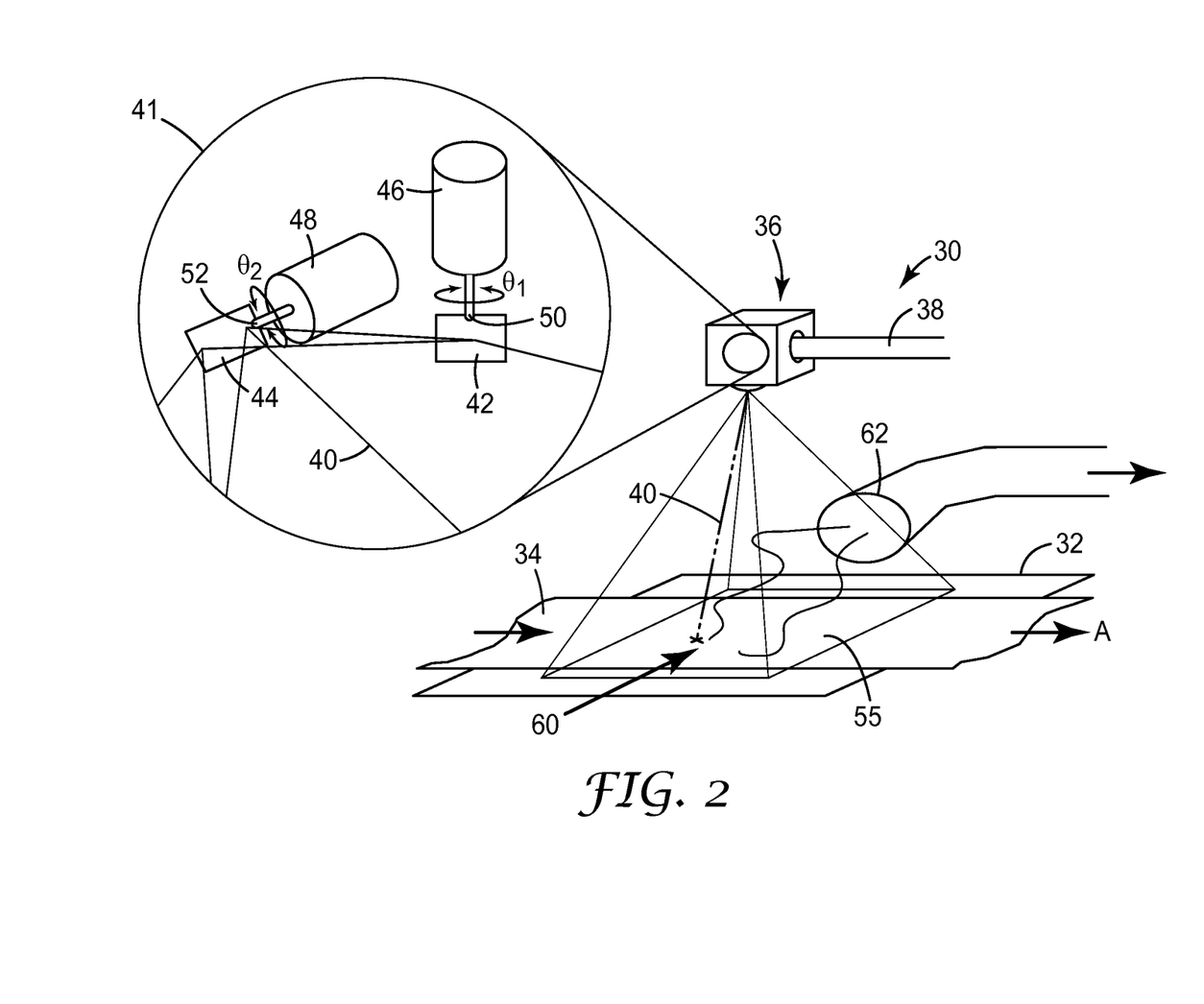
FIG. 2 is a schematic perspective view of a scanning laser processing system, including a magnified internal view of a galvanometer scanner in the laser head unit.

A scanning laser system 30 in FIG. 2 includes a fixed and flat workpiece handling surface 32 that is fixedly mounted to a stable surface such as a floor. A workpiece 34 rests on or moves across the surface 32 along the direction A. A laser head unit 36 may be fixed with respect to the table 32 and the workpiece 34, or may be moveable. A laser beam 38 is delivered to the laser head unit 36 by a laser (not shown in FIG. 2), and traverses an arrangement of small mirrors 42, 44, which form part of a galvanometer scanning unit 41. The galvanometer scanning unit 41 may include any number of mirrors 42, 44 as well as focusing optics as required for a particular application, and the arrangement shown in FIG. 2 is merely an example of one design that may be used. The mirrors 42, 44 in the galvanometer scanning unit 41 are attached to motors 46, 48 via shafts 50, 52. The mirror 42 is rotated though an angle $\theta_1$ by the motor 46, and the mirror 44 is rotated through an angle $\theta_2$ by the motor 48. The movement of the mirrors 42, 44 steers a steered laser beam 40 about the workpiece 34. Since the mirrors 42, 44 are small and lightweight, relatively little inertia must be overcome to quickly and accurately move these parts to manipulate the steered laser beam 40, and the steered beam 40 may be quickly accelerated and accurately placed in a processed area 55 on the workpiece 34.

In the scanning laser processing system 30, the working distance between the laser head unit 36 and the workpiece 34 is relatively large compared to the working distance between the laser head unit 22 and the workpiece 14 in the non-scanning system 10 of FIG. 1.

While scanning laser processing systems such as the device 30 in FIG. 2 have many desirable characteristics (high dynamic performance, increased working distances, and large processing area), additional processing functions can be difficult to perform in the processed area 55. For example, debris management on the scanning system 30 can include a fluid supply device 60 to deliver air or water to move ejected particles from the processed area 55 into a vacuum system 62, which keeps the ejected particles from settling on the workpiece 34 and interfering with laser transmission. The effectiveness of these global processing methods is limited by the large working distances between the laser head unit 36 and the workpiece 34, which ultimately provide a greater opportunity for any contaminates resulting from the laser processing to settle on and/or stain the processed parts.

The scanning laser system described in the present disclosure makes it possible to track a laser beam steered by a laser head unit distal the workpiece with a low-inertia end effector selected to perform additional processing functions local (proximal) to the processed area of the workpiece. The highly dynamic beam delivery to the processed area provided by the laser scanning system, combined with local processing capability in the processed area using the low-inertia end effector, can be important to when rapid and accurate workpiece processing is desired with minimal impact on processing speed. For example, a low-inertia nozzle that tracks the scanned laser beam can deliver air or vacuum to the processed area as the laser moves about the workpiece. This localized debris management can more effectively remove particles liberated from the workpiece by the laser, which can improve quality for sensitive products such as display panels, optical films, tapes, and the like.

Figure 3:
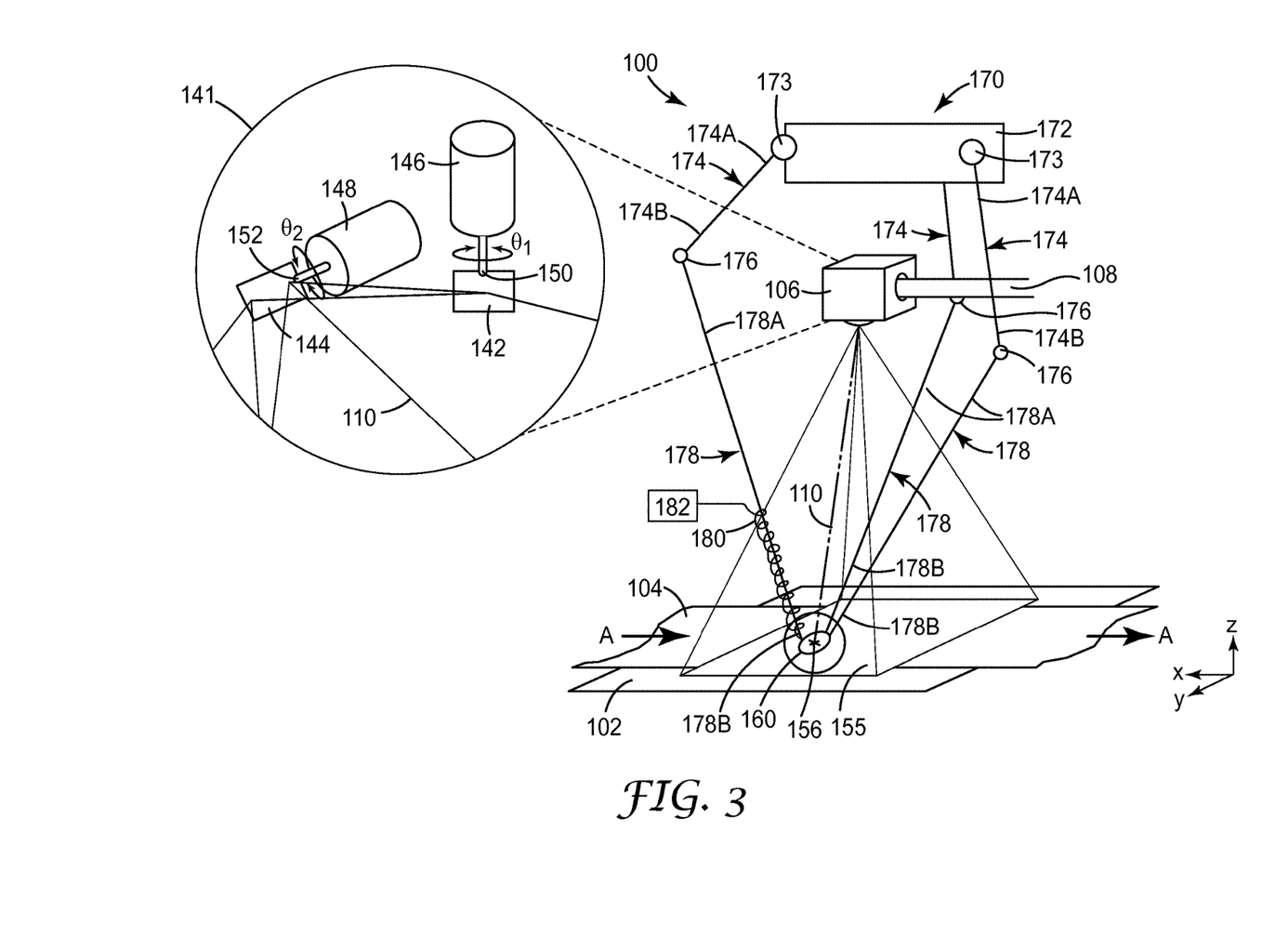
FIG. 3 is a schematic perspective view of a scanning laser processing system with a delta robotic manipulator including a magnified internal view of a galvanometer scanner in the laser head unit.

FIG. 3 illustrates an embodiment of a scanning laser material processing system 100 that includes a fixed and flat workpiece handling surface 102 fixedly mounted to a stable surface such as a floor. A workpiece 104 rests on or moves across the workpiece handling surface 102 along the direction A. A laser head unit 106 may be fixed with respect to the workpiece handling surface 102 and the workpiece 104, or may be moveable. A laser beam 108 is delivered to the laser head unit 106 by a laser (not shown).

The galvanometer scanning unit 141 includes an arrangement of motorized mirrors that can be moved to steer the laser beam 108. The galvanometer scanning unit 141 may include any number of mirrors as well as focusing optics required for a particular application, and the arrangement shown schematically in FIG. 3 is merely an example of one design that may be used. The mirrors 142, 144 in the galvanometer scanning unit 141 are attached to motors 146, 148 via shafts 150, 152. The mirror 142 is rotated though an angle $\theta_1$ by the motor 146, and the mirror 144 is rotated through an angle $\theta_2$ by the motor 148. The movement of the mirrors 142, 144 may thus be used to direct a steered laser beam 110 about the workpiece 104. Since the mirrors 142, 144 are small and lightweight, relatively little inertia must be overcome to quickly and accurately move these parts to steer the laser beam 110, and the steered beam 110 may be quickly accelerated and accurately placed in a processed area 155 on the workpiece 104.

The system 100 further includes an end effector 160 that is moved with respect to the workpiece 104 by a robotic manipulator 170. In this embodiment, the robotic manipulator is a delta robot that includes three axes and can be adapted to move the end effector 160 in any of the x, y and z directions with respect to the workpiece 104 such that the end effector 160 has a full three degrees of freedom.

In the embodiment of FIG. 3, the robotic manipulator 170 includes a stationary base 172 and an arrangement of upper arms 174 each having a first end 174A attached to a flexible joint 173 on the stationary base 172. The upper arms 174 each have a second end 174B attached to an elbow joint 176, which is in turn connected to a first end 178A of a lower arm 178. A second end 178B of each of the lower arms 178 is connected to the end effector 160.

As the steered laser beam 110 moves about the processed area 155 on the workpiece 104, and processes the workpiece 104 by cutting, drilling, scribing, machining, and the like, the end effector 160 tracks within a predetermined standoff distance d the position 156 where the laser beam is incident on the workpiece 104. The predetermined standoff distance d may vary widely depending on the intended application of the end effector 160, but in some embodiments the end effector 160 is at all times within a standoff distance d of about ±100 millimeters (mm) of the laser spot 156. In other embodiments, d is within ±5 mm of the laser spot 156, or within ±0.1 mm of the laser spot 156.

The end effector 160 may vary widely depending on the intended processing application in the area adjacent to the laser spot 156. The end effector 160 may be selected from any type of device with sufficiently low mass such that the robotic manipulator 170 can rapidly move the end effector 160 to track the laser spot 156 on the workpiece 104 with the standoff distance required for a particular application (for example, ±100 mm as noted above) over the required processing area 155. For example, the processing area 155 accessible by the end effector 160 is typically about 50×50 mm to about 500×500 mm (where debris becomes more of an issue in the 250×250 mm to 500×500 mm range), although many other sizes are possible. The end effector 160 should have sufficiently low mass such that the end effector 160 can be accelerated by the robotic manipulator 170 at rates up to 150 m/s per second. The end effector 160 typically moves at a velocity of about 1 m/s to about 5 m/s within the processed area 155, which is very useful for converting operations in a manufacturing setting.

The end effector 160 can optionally be connected to an appropriately flexible cable, tubing, optical fibers, wiring or combination thereof 180 to a source 182. The source 182 may be selected from, for example, any or all of the following: a vacuum pump, a source of pressurized fluid such as air, an inert gas, or water, a source of a solid reactant like a powder alloy mixture for sintering on the surface of the workpiece, a source of a liquid chemical that is reactive with the material from which the workpiece is made (or another chemical on the surface of the workpiece), or a radiation source such as ultraviolet (UV) to cause a chemical reaction (for example, curing) on the surface of the workpiece.

Figure 4:
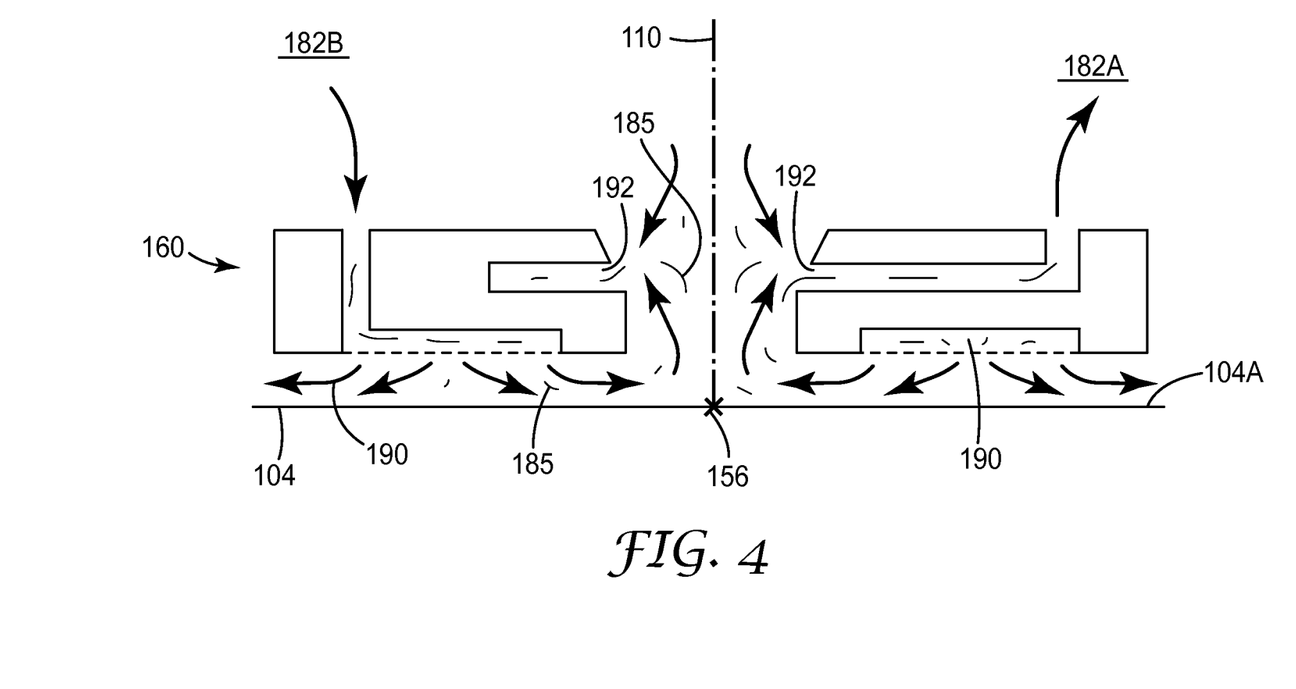
FIG. 4 is a schematic, cross-sectional view of an end effector suitable for use with the scanning laser processing systems of FIGS. 3 and 5 herein.

For example, in an embodiment suitable for debris management, the end effector 160 of FIG. 4 is a nozzle that is connected via flexible tubing 180 (FIG. 3) to a source 182 that includes vacuum 182A and a pressurized fluid 182B such as air, an inert gas or water. In this embodiment, the laser beam 110 processes the workpiece surface 104A and produces a debris plume including particles and fumes 185. The particles and fumes 185 can alter the transmission of the laser beam 110 near the surface 104A, potentially cause combustion, and adversely impact the quality of the processed product. To substantially continuously remove the particles and fumes 185 from the surface 104A, the end effector 160 includes a fluid supply nozzle portion 190 that directs the pressurized fluid from the fluid supply 182B onto the surface 104A. The flow of pressurized fluid from the fluid supply nozzle portion 190 liberates the particles and fumes 185 from the surface 104A. The liberated particles and fumes 185 are then entrained in a vacuum stream from the vacuum source 182A and removed from the surface 104A via an arrangement of vacuum nozzles 192.

As noted above, in addition to the specific debris management embodiment described above in FIG. 4, the end effector 160 may be selected from, for example, an optical element such as a camera or other lens system, a sensor for inspection of the workpiece during processing, a radiation emitter, a solid or liquid material dispenser, and combinations thereof. The end effector described herein works particularly well with laser converting of a workpiece, and can be used to advantage in constrained spaces such as moving web lines and online processing in general. However, the low-mass, high-speed end effectors described herein can be used in any application that can benefit from high-speed local motion, including active local motion (cutting, heating, vacuuming, etc.), or passive local motion (visual inspection, process monitoring, etc.), or a combination of both.

Figure 5:
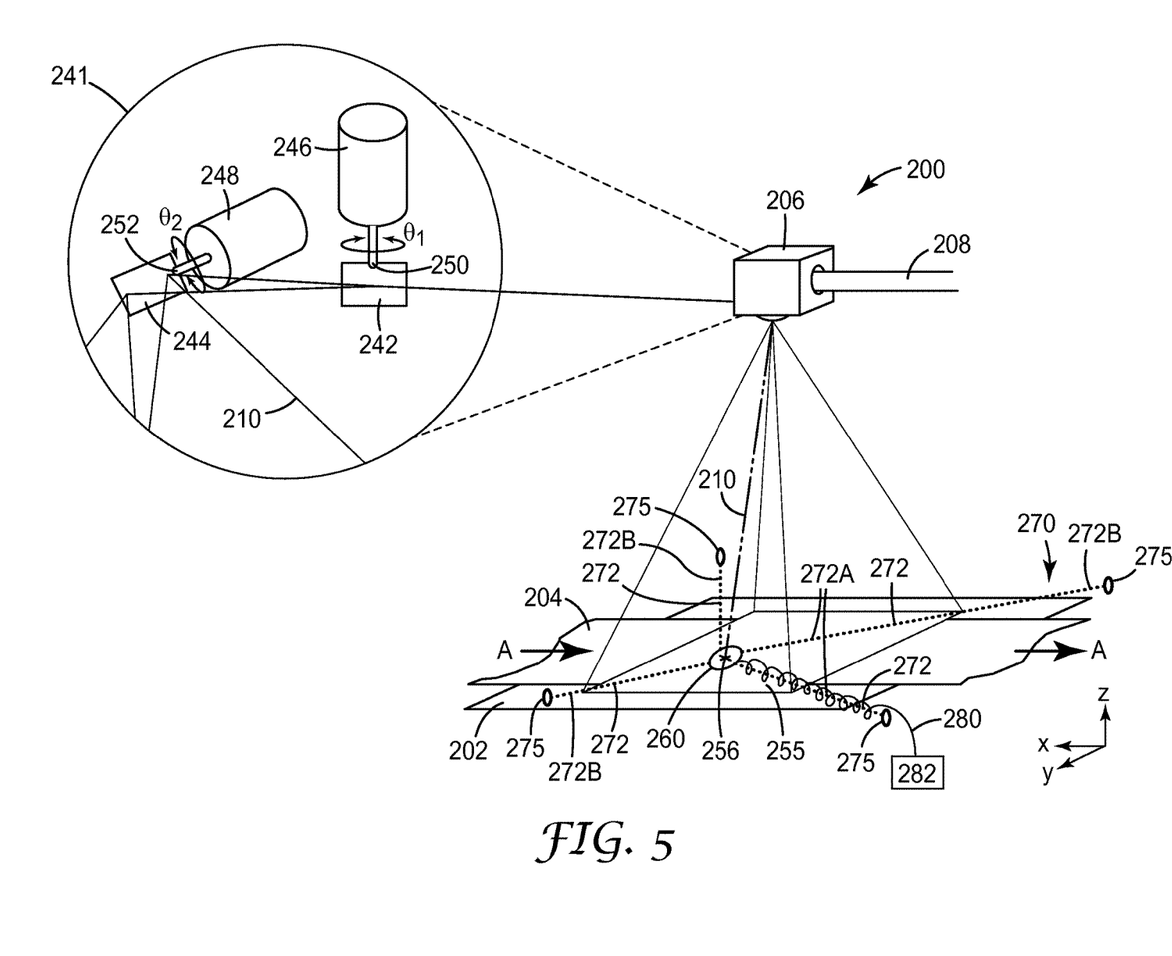
FIG. 5 is a schematic perspective view of a scanning laser processing system with a cable suspended robotic manipulator including a magnified internal view of a galvanometer scanner in the laser head unit.

FIG. 5 is a schematic representation of another embodiment of a scanning laser material processing system 200 that includes a fixed and flat workpiece handling surface 202 fixedly mounted to a stable surface such as a floor. A workpiece 204 rests on or moves across the workpiece handling surface 202 along the direction A. A laser head unit 206 may be fixed with respect to the workpiece handling surface 202 and the workpiece 204, or may be moveable. A laser beam 208 is delivered to the laser head unit 206 by a laser (not shown).

The galvanometer scanning unit 241 includes an arrangement of motorized mirrors that can be moved to steer the laser beam 208. The galvanometer scanning unit 241 may include any number of mirrors as well as focusing optics as required for a particular application, and the arrangement shown schematically in FIG. 5 is merely an example of one design that may be used. The mirrors 242, 244 in the galvanometer scanning unit 241 are attached to motors 246, 248 via shafts 250, 252. The mirror 242 is rotated though an angle $\theta_1$ by the motor 246, and the mirror 244 is rotated through an angle $\theta_2$ by the motor 248. The movement of the mirrors 242, 244 may thus be used to direct a steered laser beam 210 about the workpiece 204. Since the mirrors 242, 244 are small and lightweight, relatively little inertia must be overcome to quickly and accurately move these parts to direct the steered laser beam 210, and the steered beam 210 may be quickly accelerated and accurately placed in a processed area 255 on the workpiece 204.

The system 200 further includes an end effector 260 that is moved with respect to the workpiece 204 by a robotic manipulator 270. In this embodiment, the robotic manipulator 270 is a cable robot manipulated by a plurality of tensioned cables 272. By varying the relative tensions in the cables 272, the position, velocity, and acceleration of the end effector 260 can be accurately controlled to track the laser beam spot 256 on the workpiece 204. The cable-suspended morphology of the robotic manipulator 270 reduces further the inertia of the robotic manipulator 270 to only that of the suspension cables 272 and actuator internals (not shown), so the robotic manipulator 270 has lower inertia than the robotic manipulator 170 of FIG. 3. The cable robot 270 can include any number of cables 272, and in the example of FIG. 5 includes four cables and provides three degrees of freedom for movement of the end effector 260. Using seven cables 272, the robot 270 can have up to six degrees of freedom and can be adapted to move the end effector 260 in any of the x, y and z directions (and rotationally) with respect to the workpiece 204.

Figure 6:
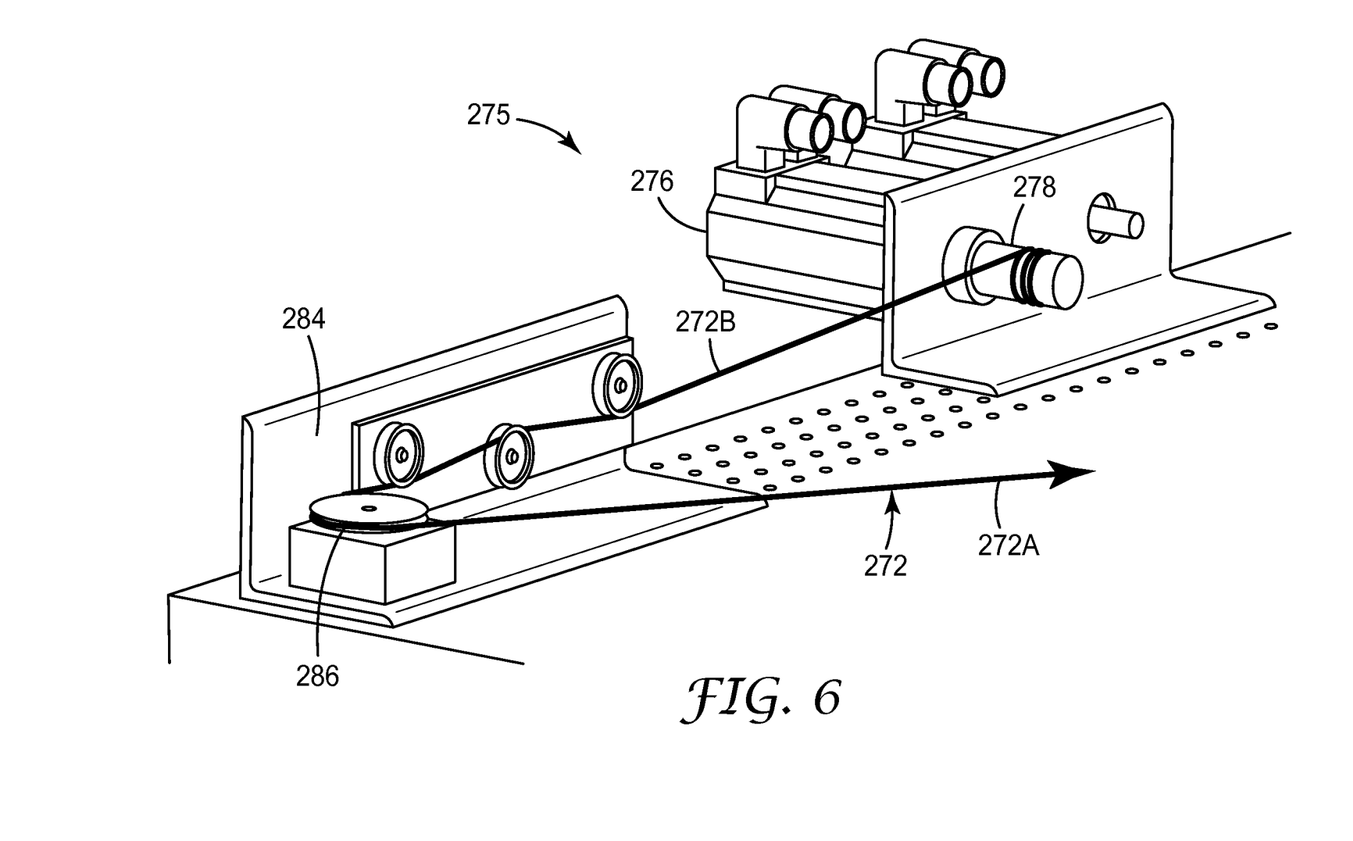
FIG. 6 is a perspective view of a cable control mechanism suitable for use with the scanning laser processing systems of FIG. 5.

In the embodiment of FIG. 5, the cables 272 each include a first end 272A attached to the end effector 260 and a second end 272B attached to a cable control mechanism 275. FIG. 6 shows an example of a cable control mechanism 275 for a single cable 272. The cable control mechanism, which controls the tension and effective length of the cable 272, includes a motor 276 with an output shaft having mounted thereon a winch drum 278. The winch drum 278 engages the second end 272B of the cable 272. After passing through a tension load cell 284 and around a guiding pulley 286, the first end 272A of the cable 272 connects to the end effector 260.

Using this design, the end effector 260 does not come into contact with the workpiece 204, but is suspended over the processing area 255 via the tension maintained in the cables 272 by the cable control mechanisms 275. Any droop in the cables 272 due to gravity acting on the end effector 260 can optionally be reduced and/or eliminated by connecting the end effector 260 to flexible tubing 280, which is in turn connected to a source 282 of a pressurized gas such as air. The end effector can then use the pressurized gas exiting the end effector 260 as an air bearing to maintain the end effector 260 above the processing area 255.

As the steered laser beam 210 moves about the processed area 255 on the workpiece 204, and processes the workpiece 204 by cutting, drilling, scribing, machining, and the like, the end effector 260 tracks within a predetermined standoff distance d the position 256 where the laser beam is incident on the workpiece 204. The predetermined standoff distance d may vary widely depending on the intended application of the end effector 260, but in some embodiments the end effector 260 is at all times within a standoff distance d of about ±100 millimeters (mm) of the laser spot 256. In other embodiments, d is within ±5 mm of the laser spot 256, or within ±0.1 mm of the laser spot 256.

The end effector 260 may vary widely depending on the intended application, and can be selected from any type of device with sufficiently low mass such that the robotic manipulator 270 can rapidly move the end effector 260 to track the laser spot 256 on the workpiece 204 with the standoff distance required for a particular application (for example, ±100 mm as noted above) over the required processing area 255. For example, the processing area 255 accessible by the end effector 260 using the cable suspended robot 270 is typically about 50×50 mm to about 500×500 mm, although many other sizes are possible. The end effector 260 should have sufficiently low mass such that the end effector 260 can reach velocities of at least about 5 m/s be accelerated by the robotic manipulator 270 at rates up to 200 m/s per second (20 times the force of gravity, G).

The end effector 260 can optionally be connected to a flexible cable, tubing, optical fibers, wiring or combination thereof 280 to a source 282. The source 282 may be selected from, for example, any or all of the following: a vacuum pump, a source of pressurized fluid such as air, an inert gas, or water, a source of a solid reactant like a powder alloy mixture for sintering on the surface of the workpiece, a source of a liquid chemical that is reactive with the material from which the workpiece is made (or another chemical on the surface of the workpiece), or a radiation source such as ultraviolet (UV) to cause a chemical reaction (for example, curing) on the surface of the workpiece.

In addition to the specific debris management embodiment described above in FIG. 4, the end effector 260 may be selected from, for example, an optical element such as a camera or other lens system, a sensor for inspection of the workpiece during processing, a radiation emitter, a solid or liquid material dispenser, and combinations thereof. The end effector 260 described herein works particularly well with laser converting of a workpiece, and can be used to advantage in constrained spaces such as moving web lines and online processing in general. However, the low-mass, high-speed end effectors can be used in any application that can benefit from high-speed local motion, including active local motion (cutting, heating, vacuuming, etc.), or passive local motion (visual inspection, process monitoring, etc.) or a combination of both.

Figure 7:
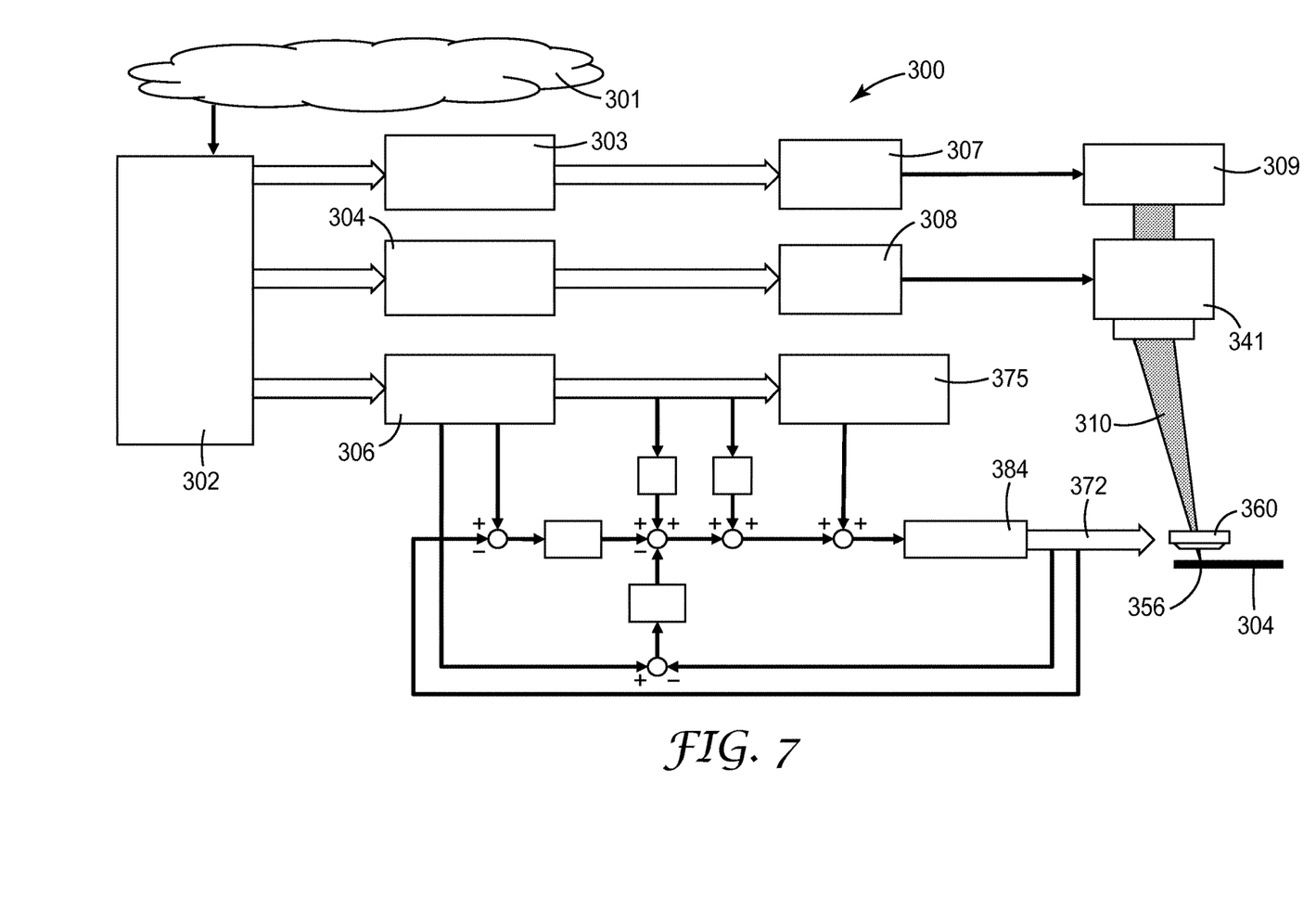
FIG. 7 is a flow chart of a control unit suitable for controlling the operation of the cable-suspended scanning laser processing system of FIG. 5.

FIG. 7 is a schematic flow diagram illustrating an embodiment of a control unit 300 including a processor configured to cause an end effector 360 to track the movement of a laser beam 310 over the surface of a workpiece 304 (see also FIGS. 5-6). To control the movement of the laser beam 310 with respect to the workpiece 304, an operator initially inputs a laser trajectory data along with trajectory parameters 301 into the control unit 300 in the form of workpiece coordinates at a location on, above or below the workpiece 304. The control unit 300 includes a trajectory generation module 302 that generates, based on the laser trajectory and parameters 301, power signals for a laser control module 303, trajectory data for a laser head unit control module 304, and robot position data to a robotic manipulator control module 306.

The laser control module 303 provides laser control signals to a laser controller 307 to power the laser 309. The laser head unit control module 304 provides laser head unit control signals to a laser head unit controller 308 as rotational position data for the mirror array in the galvanometer 341, which in turn controls the trajectory with respect to the workpiece 304 of the steered laser beam 310 emitted by the laser 309.

The robot position data provided by the robotic manipulator control module 306 includes, for example, angular position data for the winch drums and tension data for the cables of the robotic manipulator (FIGS. 5-6). The robotic manipulator control module 306 activates a cable mechanism 375 controlling a tension load cell 384 and an arrangement of cables 372. For example, in some embodiments the robot position data can be provided to the cable mechanism 375 as rotational data corresponding to winch drum angles (and thus effective cable lengths). These signals can be converted into torque data based on positional feedback for input to the respective tension load cells 384. The above results in the proper relative tension in the respective cables to position the end effector 360 at a location 356 with respect to the workpiece 304 as specified by the imported artwork and parameters 301.

The laser head unit control signals and the robotic manipulator control signals are coordinated by the processor in the controller 300 such that the end effector 360 tracks the movement of the steered laser beam 310 within a predetermined standoff distance d (FIG. 5) from the position 356 where the laser beam 310 is incident on the workpiece 304.

The laser head unit control signals and the robotic manipulator control signals may be generated as software instructions executed by one or more processors in the modules of the control unit 300, including one or more hardware microprocessors, digital signal processors (DSPs), application specific integrated circuits (ASICs), field programmable gate arrays (FPGAs), or any other equivalent integrated or discrete logic circuitry, as well as any combinations of such components. The software instructions may be stored within in a non-transitory computer readable medium, such as random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media.

The processing systems described above are particularly well suited for converting and processing of web materials in a roll-to-roll manufacturing process. In such processes the workpiece is a moving web of material that is converted at high speeds with scanned lasers, and the low-inertia end effector can be used to further process the area converted by the scanned laser beam. For example, the low-inertial material processing systems described herein can be useful in any such high throughput process that can benefit from (or requires) clean converting through laser processing. In particular, the low-inertial material processing systems herein are useful for clean laser converting of debris-sensitive film products in which the optical quality of the final product is important such as, for example, LCD panels, anti-graffiti films, and tapes.

The controller 300 of FIG. 7 may be located within a manufacturing plant, or may be located external to the manufacturing plant, or a combination of both e.g., at a central location or at a converting site. The described components can execute on a single computing platform or may be integrated into the same software system.

EXAMPLES

A material processing system with low-inertia laser scanning and end effector motion was constructed using a 2-axis laser scan head and a 3 degree of freedom cable suspended robot as depicted in FIG. 5. Table 1 provides a list of commercially available equipment used in constructing the example described below.

TABLE 1

| Part | Manufacturer | Description |
| --- | --- | --- |
| Motor | Kollmorgen Radford, VA | AKM32H AC Synchronous Servo Motor |
| Drive | Kollmorgen | AKD-x00606 Single Axis Servo Drive |
| Galvo Scanner | Nutfield, Hudson, NH | XLR8 2-Axis Scan Head |
| Laser | Synrad Mulkiteo, WA | Evolution 100 $CO_2$ |
| Embedded Controller | National Instruments Austin, TX | CRIO-9082 RT 1.33 GHz Dual-Core Controller with LX150 FPGA |
| Drive Interface Module | National Instruments | 9516 C Series Drive Interface with Dual Encoder Feedback |
| Analog Input Module | National Instruments | 9205 32 Ch., 16-Bit, 250 kS/s Analog Input Module |
| Digital I/O Module | National Instruments | 9401 8 Ch., 5 V/TTL High-speed Bidirectional Digital I/O Module |
| Tension Sensor | Electromatic Cedarhurst, NY | TE-50K-24-04 3-Roller Tension Sensor, 0-50 Kg |

The laser scan head listed in Table 1 was mounted with a 204 mm working distance lens resulting in a field size of 140×140 mm. The cable suspended robot was custom built using the electronics, motors, and drives included in Table 1. The four cable guidance assemblies (tension load cells 284 and guiding pulleys 286, FIG. 6) were mounted in a rectangular arrangement with the guiding pulleys 286 located at the corners of a 1.4×0.83 meter rectangle resulting in an end effector work space of approximately 1.2×0.6 meters.

The material processing system was controlled by the scheme outlined in FIG. 7. The components of the control unit 300 were distributed between a local host PC and the embedded controller listed in Table 1 with the two connected via Ethernet. The laser control module 303, the laser head unit control module 304, the robotic manipulator control module 306 were implemented on the local host personal computer (PC). The laser controller 307 and the laser head unit controller 308 were implemented on the embedded controller utilizing the available FPGA resources.

Set points for the controllers 307, 308 were computed offline via the modules 303, 304, 306 on the host PC. Given a specified trajectory, Cartesian coordinates were generated by the trajectory generation module 302 for the laser spot position 356 and the position of the end effector nozzle 360. The trajectory generation module 302 also provided the corresponding laser control signals for the laser control module 303 for transmission to the laser controller 307 (i.e., laser output power in Watts), taking into account all necessary delays and offsets.

The Cartesian coordinates for the galvanometer 341 and the end effector 360 were then passed to the laser head unit control module 304 and the robotic manipulator control module 306 respectively and transformed into the native coordinate systems of the galvanometer 341 and cable controller 375. These native coordinates describe mirror angles for the galvanometer 341 and winch drum rotations for the cable controller 375. For each set point, corresponding optimal tensions were calculated by the robotic manipulator control module 306 based on a specified minimum cable tension as well as the structure matrix of the system determined by the robot's physical characteristics and the position of the end effector 360. We found minimum tension values of 15-20 N to be good values given the setup and expected dynamic performance of the described example.

From the above described native trajectory data, the appropriate control signals were generated by the respective controllers 307, 308, 375 running on the FPGA of the embedded controller listed in Table 1. The laser controller 307 takes the trajectory power data and generates the corresponding TTL waveform to drive the laser output. The laser head unit controller 308 sends the computed galvo mirror angles to the galvo scanner 341 via the XY2-100 scanner protocol; these signals were generated by the 9401 digital I/O module. The cable controller 375 takes in the optimal tensions (as torques) as well as the desired winch angular positions and sends appropriate torque values to the tension load cells 384 using the motor drives listed in Table 1 while taking into account feedback from the motor encoders. All torque commands are sent by the cable controller 375 to the tension load cells 384 via the 9516 drive interface modules.

All trajectory data (set points, laser control, and optimal tensions) was generated at 0.5 millisecond time steps resulting in a 2 kHz update rate. The laser controller 307, galvo controller 308, cable controller 375 were run at 20 kHz.

The executed path consisted of a 40 millimeter square centered about the workspace origin. The path began at the origin and moved negatively along the x-axis and positively along the y-axis to the upper-left corner, then moved negatively along the y-axis to the lower-left corner, then positively along the x-axis to the lower-right corner, then positively along the y-axis to the upper-right corner then negatively along the x-axis back to the upper-left corner, then finally back to the origin. The trajectory generated by the trajectory generation module 302 was acceleration limited to 150 m/s per second and set to maximize velocity, thus resulting in a piecewise constant acceleration profile, continuous velocity profile, and a continuously differentiable position profile.

Input coordinates to the laser head unit controller 308 were generated by the laser head unit control module 304 using bilinear interpolation based on collected galvo scanner calibration data.

Inputs to the cable controller 375 were generated by the robotic manipulator control module 306. These calculations were made based on relative cable lengths resulting from the geometry of the mechanical system including the cable mechanisms and their location within the workspace.

The coordinates provided by the cable controller 375 were supplemented by optimal static tensions calculated by the robotic manipulator control module 306. These tensions are calculated based on a provided minimum allowed cable tension along with the structure matrix of the system (itself a function of the end effector position).

Figure 8:
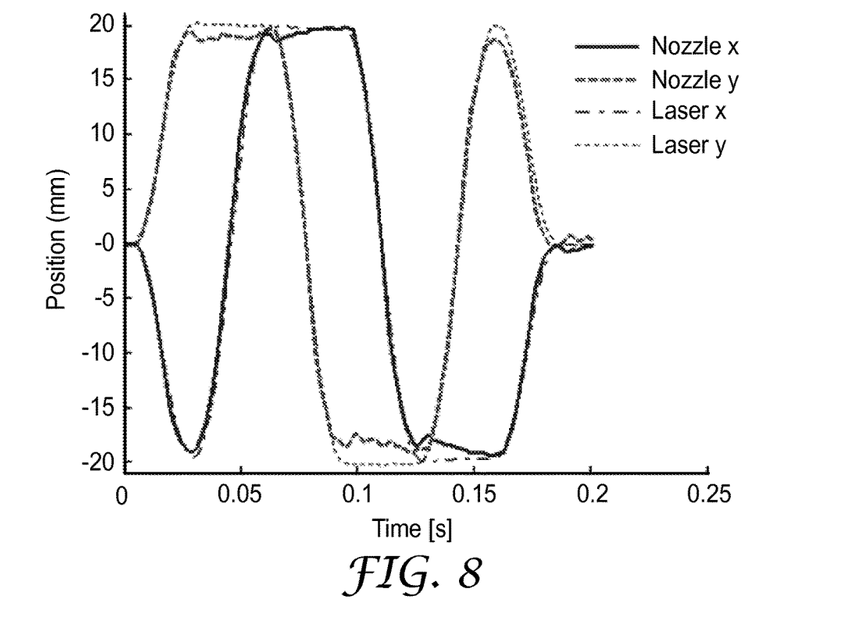
FIG. 8 is a plot of the position of the laser spot and the position of the end effector vs. time for the robotic manipulator in the Example. The end effector position along the x and y axes is represented by the solid and dashed lines respectively, and the laser spot position along the x and y axes is represented by the dash-dotted and dotted lines respectively.
Figure 9:
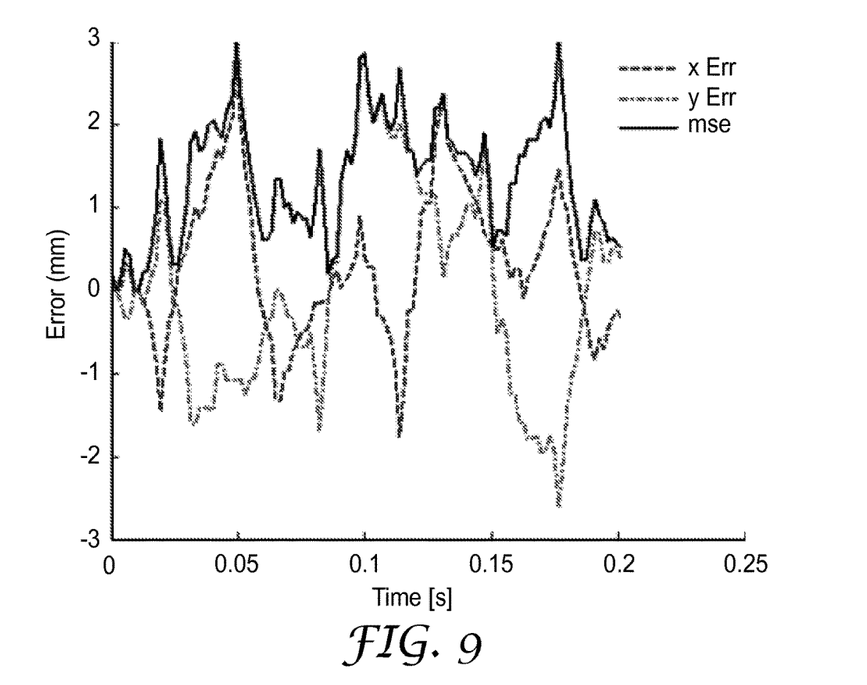
FIG. 9 is a plot of the relative positional error between the end effector and laser spot position, where the relative x and y errors are represented by the dashed and dash-dotted lines respectively. The solid line depicts the vector norm of the total relative error (square root of the sum of squares) of the system along the length of the trajectory.

The end effector 360 had a mass of 17 grams. The output of the system (combined synchronous motion of the laser 309 and the end effector 360) was verified using high speed video capture. The real-world Cartesian coordinates from the calibrated video are shown in FIG. 8, where the position of the end effector 360 along the x and y axes is represented by the solid and dashed lines respectively; the laser spot position along the x and y axes is represented by the dash-dotted and dotted lines respectively. The relative positional error between the end effector 360 and the laser spot position 356 is shown in FIG. 9, where the relative x and y errors are represented by the dashed and dash-dotted lines respectively. The solid line depicts the total relative error (square root of sum of squares) of the system along the length of the trajectory. With this particular setup we observed less than 3 mm of relative error along the entirety of the trajectory.

Various embodiments of the invention have been described. These and other embodiments are within the scope of the following claims.

The invention claimed is:

1. A system comprising:
 a robotic manipulator selected from a delta robot and a cable-suspended robot, wherein the robotic manipulator comprises a stationary base;
 an end effector attached to the robotic manipulator, wherein the end effector is adjacent to a sample region of a workpiece, and wherein the end effector is selected from at least one of a debris management apparatus, an optical element, a sensor, a radiation emitter and a material dispenser;
 an end effector supply system connected to the end effector, wherein the end effector has a mass no greater than 17 grams and is accelerated by the robotic manipulator at a rate up to 150 m/s per second;
 a scanning laser head unit that is fixed with respect to the workpiece, wherein the laser scanning unit comprises a laser and a galvanometer scanner configured to move a laser beam to a position in the sample region of the workpiece; and
 a control unit configured to move the robotic manipulator to track the laser beam position within a distance of ±3 millimeters from the position of the laser beam in the sample region of the workpiece, wherein the control unit comprises a trajectory generation module that generates, based on laser trajectory and parameters, power signals for a laser control module to control the laser beam, trajectory data for a laser head unit control module to control the scanning laser head unit, and robot position data for a robotic manipulator control module to actuate the robotic manipulator.

2. The system of claim 1, wherein the debris management apparatus comprises a vacuum nozzle, and the end effector supply system comprises at least one of a vacuum source and a supply of a fluid, optionally wherein the optical element comprises a camera, or the radiation emitter comprises a source of ultraviolet radiation.

3. The system of claim 1, wherein the end effector comprises a material dispenser, and the end effector supply system comprises a source of a reactive material to be dispensed onto the workpiece by the material dispenser, or a material dispenser, and the end effector supply system comprises a source of an inert gas.

4. The system of claim 1, wherein the cable robot comprises a cable control apparatus attached to the stationary base and actuated by the robotic manipulator control signals, an arrangement of at least three tensioned cables each having a first end attached to the cable control apparatus and a second end attached to the end effector.

5. The system of claim 1, wherein the workpiece is non-stationary with respect to the stationary base of the robotic manipulator.

6. A method for debris management, comprising:
mounting a scanning laser head unit over a web of material, wherein the scanning laser head unit comprises a laser and a galvanometer scanner configured to move a laser beam over a surface of the material;
mounting over the web a robotic manipulator selected from a delta robot and a cable-suspended robot; wherein the robotic manipulator has attached thereto an end effector comprising a debris management apparatus, wherein the end effector has a mass no greater than 17 grams and is accelerated by the robotic manipulator at a rate up to 150 m/s per second; and
moving the robotic manipulator and the end effector so that the debris management apparatus tracks the laser beam within a distance of ±3 millimeters from the position of the laser beam in the sample region of the workpiece, and removes debris from the surface.

7. The method of claim 6, wherein the laser beam is controlled by a trajectory generation module that generates, based on laser trajectory and parameters, power signals for a laser control module to control the laser beam, trajectory data for a laser head unit control module to control the scanning laser head unit, and robot position data for a robotic manipulator control module to actuate the robotic manipulator.

8. The method of claim 6, wherein the debris management apparatus is connected to a vacuum source and a source of a gas.

9. The method of claim 6, wherein the web and the head unit are moving relative to one another.

* * * * *